United States Patent
Bharadwaj

(10) Patent No.: US 10,938,702 B2
(45) Date of Patent: *Mar. 2, 2021

(54) JUST-IN-TIME IDENTIFICATION OF SLOW DRAIN DEVICES IN A FIBRE CHANNEL NETWORK

(71) Applicant: Cisco Technology, Inc., San Jose, CA (US)

(72) Inventor: Harsha Bharadwaj, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/551,336

(22) Filed: Aug. 26, 2019

(65) Prior Publication Data

US 2019/0386906 A1    Dec. 19, 2019

Related U.S. Application Data

(63) Continuation of application No. 15/256,529, filed on Sep. 3, 2016, now Pat. No. 10,397,086.

(51) Int. Cl.
*H04L 12/26* (2006.01)
*H04L 12/935* (2013.01)
*H04L 12/823* (2013.01)

(52) U.S. Cl.
CPC .......... *H04L 43/10* (2013.01); *H04L 43/0882* (2013.01); *H04L 47/32* (2013.01); *H04L 49/30* (2013.01)

(58) Field of Classification Search
CPC ..... H04L 43/0882; H04L 47/32; H04L 49/30; H04L 43/10; H04L 41/22; H04L 43/022; H04L 43/045; H04L 43/0876; H04L 43/0894; H04L 43/16
See application file for complete search history.

(56) References Cited

U.S. PATENT DOCUMENTS

| | | | |
|---|---|---|---|
| 7,324,441 B1 | 1/2008 | Kloth et al. | |
| 8,593,964 B1 * | 11/2013 | Sinha | H04L 47/11 370/235 |
| 2005/0108444 A1 | 5/2005 | Flauaus et al. | |
| 2009/0116381 A1 | 5/2009 | Kanda | |
| 2009/0154358 A1 | 6/2009 | Kanda et al. | |
| 2011/0110381 A1 | 5/2011 | Atkinson et al. | |
| 2012/0014253 A1 | 1/2012 | Rongong et al. | |
| 2012/0063303 A1 | 3/2012 | Gnanasekaran et al. | |
| 2012/0063304 A1 | 3/2012 | Gnanasekaran et al. | |
| 2012/0063329 A1 | 3/2012 | Gnanasekaran et al. | |

(Continued)

*Primary Examiner* — Oussama Roudani
(74) *Attorney, Agent, or Firm* — Polsinelli PC

(57) ABSTRACT

One embodiment is a method and includes periodically polling a plurality of interface counters associated with each of an edge port and an Inter-Switch Link ("ISL") port of a first fibre channel ("FC") switch, wherein a target device is connected to the edge port of the first FC switch, and a plurality of interface counters associated with ISL port of a second FC switch, wherein the ISL port of each of the first and second FC switches are connected to one another via an ISL; determining based on the polling of the various counters whether several conditions have been met for a predetermined number of times and if so, characterizing the edge port as a level 1 slow drain port and taking remedial action based on the characterization.

15 Claims, 9 Drawing Sheets

(56) References Cited

U.S. PATENT DOCUMENTS

| | | |
|---|---|---|
| 2012/0063333 A1 | 3/2012 | Gnanasekaran et al. |
| 2013/0286858 A1 | 10/2013 | Gnanasekaran et al. |
| 2013/0343186 A1 | 12/2013 | Gnanasekaran et al. |
| 2014/0029466 A1 | 1/2014 | Gnanasekaran et al. |
| 2014/0056147 A1 | 2/2014 | Gnanasekaran et al. |
| 2015/0086054 A1 | 3/2015 | Michel et al. |

* cited by examiner

US 10,938,702 B2

JUST-IN-TIME IDENTIFICATION OF SLOW DRAIN DEVICES IN A FIBRE CHANNEL NETWORK

CROSS-REFERENCE TO RELATED APPLICATION

The instant application is a Continuation of, and claims priority to, U.S. patent application Ser. No. 15/256,529, entitled JUST-IN-TIME IDENTIFICATION OF SLOW DRAIN DEVICES IN A FIBRE CHANNEL NETWORK, filed Sep. 3, 2016, the contents of which are herein incorporated by reference in its entirety.

TECHNICAL FIELD

This disclosure relates in general to the field of fibre channel communications networks and, more particularly, to techniques for just-in-time identification of slow drain devices using interface statistics in a time-series database in such networks.

BACKGROUND

Fibre Channel ("FC") network is a no-drop network that operates on a credit-based flow control mechanism for communication between any pair of ports. A buffer-to-buffer ("B2B") credit number for a peer port tracks the number of packet buffers available on a peer port for packet transmission toward that port. An FC packet may be transmitted by a port only if it has B2B credit for the peer port that is greater than zero. A packet transmitted from a port decrements the B2B credit counter of that port. An acknowledgement of completion of processing of a packet takes the form of a Receiver Ready ("R_RDY") primitive signal from the peer port, which increments the B2B credit counter. The R_RDY primitive only contains information that a buffer is available at the port sending R_RDY and no other information. The B2B counter associated with the transmit buffer of a switch is referred to as a TX_B2B counter and the B2B counter associated with the receive buffer of a switch is referred to as an RX_B2B counter.

A "slow drain device" (or simply "slow device," as used herein) is a device that does not accept frames at the rate generated by a source; i.e., the R_RDY signals are delayed in response to the frames. A device is only characterized as a slow drain device in situations in which the slow draining nature of the device impacts other devices in a Storage Area Network ("SAN"). Typical FC networks are designed in an Edge-Core or an Edge-Core-Edge fashion in which server and storage devices are connected to edge switches and the core and edge switches are connected by Inter-Switch Links ("ISLs"). In the presence of slow drain devices, FC networks are likely to run out of switch packet buffers, resulting in switch port credit starvation and potential choking of Inter-Switch Links ("ISLs"). An ISL running out of B2B credits results in traffic flows unrelated to the slow drain/stuck device being impacted, due to head-of-line blocking. A slow drain/stuck device condition can arise due to problems in the server Operating System ("OS") or host bus adapters ("HBAs"), storage issues, switch misconfigurations (e.g., speed mismatches), among other issues. Many cases involving slow drain devices are due to servers being overwhelmed by large chunks of data being received from a storage device in response to a READ operation from the server. Large storage area network ("SAN") installations may face this problem on a daily basis and may fence off the ports that are deemed to be slow drain ports (e.g., 25-30 ports per day).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One embodiment is a method and includes periodically polling a plurality of interface counters associated with each of an edge port and an Inter-Switch Link ("ISL") port of a first fibre channel ("FC") switch, wherein a target device is connected to the edge port of the first FC switch; periodically polling a plurality of interface counters associated with ISL port of a second FC switch, wherein the ISL port of each of the first and second FC switches are connected to one another via an ISL; and determining based on the polling whether a first condition has been met, wherein the first condition includes that the edge port has experienced buffer exhaustion at least once and has been waiting for a ready signal from the target device for at least a first predetermined time period. The method further includes, if it is determined that the first condition has been met, determining whether a second condition has been met, wherein the second condition includes that at least a first percentage of data frames received over the ISL is being buffered at the first switch and that at least a second percentage of data frames buffered at the first switch is directed toward the edge port; if it is determined that the second condition has been met, determining whether a third condition has been met, wherein the third condition incudes that the ISL port of the second FC switch has experienced buffer exhaustion at least once; and if it is determined that the first, second, and third conditions have been met a first predetermined number of times, characterizing the edge port as a level 1 slow drain port. In certain embodiments, the method further includes, if the edge port has been characterized as a level 1 slow drain port, taking level 1 remedial action in connection with the edge port.

Example Embodiments

Figure 1:
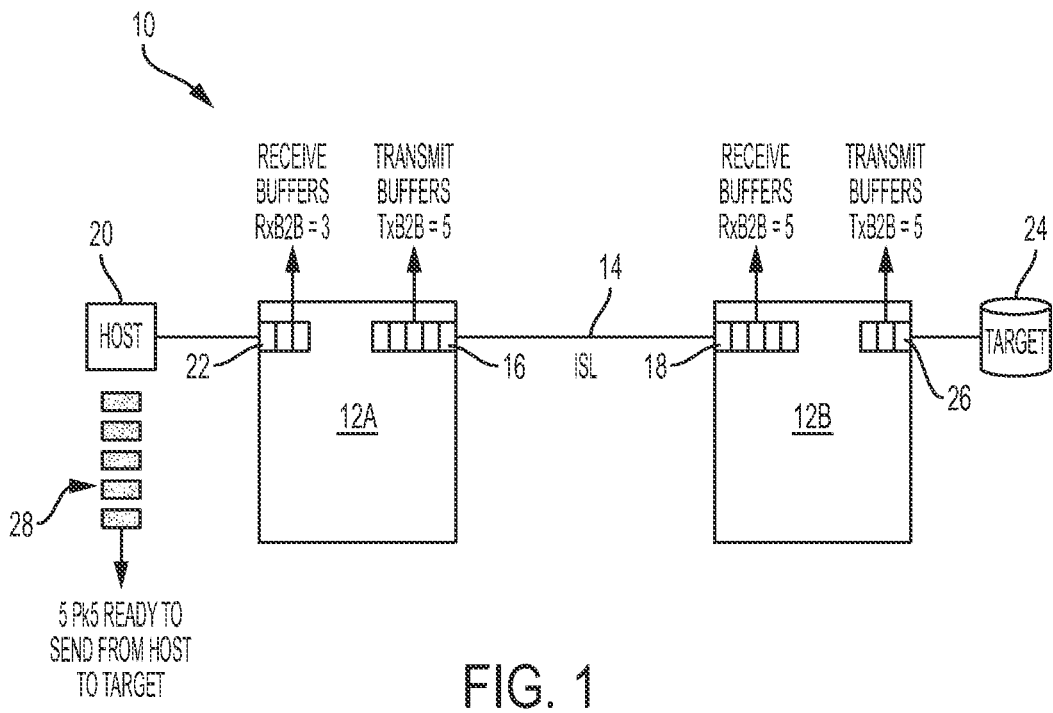
FIG. 1 is a simplified block diagram of an FC network in which embodiments described herein for just-in-time identification of slow drain devices in FC networks may be implemented.

FIG. 1 is a simplified block diagram of an FC network 10 in which embodiments described herein for just-in-time identification of slow drain devices in FC networks using interface statistics in a time-series database may be implemented. As shown in FIG. 1, the network 10 includes two FC switches 12A, 12B, interconnected via an ISL 14 operatively disposed between a transmit buffer 16 of the switch 12A and a receive buffer 18 of the switch 12B. A host 20, which may comprise a server, is operatively connected to a receive buffer 22 of the switch 12A. Similarly, a target 24, which in the illustrated embodiment comprises a SAN storage device, is operatively connected to a transmit buffer 26 of the switch 12B. Each of the receive buffers 18, 22, is associated with a port having associated therewith an RX_B2B counter. Similarly, each of the transmit buffers 16, 26, is associated with a port having associated therewith a TX_B2B counter.

Although not shown, it will be recognized that one or more hypervisors may be executing on the host 20 for instantiating a plurality of virtual machines ("VMs") for performing various tasks. In one embodiment, each of the FC switches 12A, 12B, is implemented using an MDS 9000 series switch available from Cisco Systems, Inc., of San Jose, Calif. Some FC switches, including the aforementioned MDS 9000 series switches, include certain mechanisms for identifying slow drain devices. Such mechanisms may include tracking an amount of time spent waiting for credits (B2B=0) on a port with a configurable timeout threshold (100 ms). Employing this mechanism, once the wait time for a frame on a port exceeds the designated threshold, the connected device is deemed slow drain or stuck. The device may then be quarantined from the network 10 by configuring port monitor policies with such actions as Link Reset, Link Flap, Error Disable Port, Drop All Packets, etc.

The R_RDY primitive described above does not indicate for which class of traffic a buffer is available. For this, a proprietary enhanced version of R_RDY called Extended R_RDY ("ER_RDY") is implemented in certain FC switches, such as the above-mentioned MDS 9000 series switches, to return credits per class value (e.g., up to 8 class values) on an FC link. This feature enables virtual partitioning of B2B credits on a physical link per class of traffic and accounts and also returns B2B credits as ER_RDYs per class. This feature works only on ISLs among certain types of switches (e.g., MDS 9000 series switches) and may not be enabled on edge ports ("F ports") connecting to end devices.

The FC ASICs on Cisco MDS 9000 series SAN multilayer switches ("MDSes") support the following counters related to B2B credits implemented in the ASIC:

TX_B2B: The B2B credits available in the transmit direction of an FC port (instantaneous counter)

RX_B2B: The B2B credits available in the receive direction of an FC port (instantaneous counter)

TX_BBZ: The number of transitions of TX_B2B credit value to 0 (cumulative counter)

TX_WAIT: The number of clock cycles (2.5 µs) that the port waited for in TX_B2B credit value=0 condition with frames ready to transmit (cumulative counter)

TIMEOUT_DISCARD: The number of frames dropped while waiting for transit due to timeout (typically 500 ms) (cumulative counter)

Certain ISLs may operate in two special modes with respect to link level crediting when the devices at both ends of the ISL are MDSes (such as illustrated in FIG. 1). These special modes include High/Low crediting and ER_RDY-based crediting. In High/Low crediting mode, the configured link credits are divided in two, with a first portion of the credits being designated High credits and the remainder designated Low credits. High credits are mapped to Class F (i.e., control protocol) frames, while Low credits are mapped to Class 2/3 frames. While it still uses the RRDY mechanism, High credit buffer frames are sent out before the Low ones.

ER_RDY-based crediting mode is a proprietary enhanced version of R_RDY in which link crediting is done per class (for up to eight classes) on a FC link. ER_RDY virtually partitions the B2B credits on a physical link per class of traffic and accounts and also returns B2B credits as ER_RDYs per class. While High/Low crediting mode partitions link credits into two categories of credits, ER_RDY can partition the link credits into a maximum of eight such categories. When an ISL operating in either of these enhanced crediting modes is configured as a Port Channel ("PC"), the control protocols on the ISL will run only in the First Operational Port ("FOP") of the PC.

Figure 2:
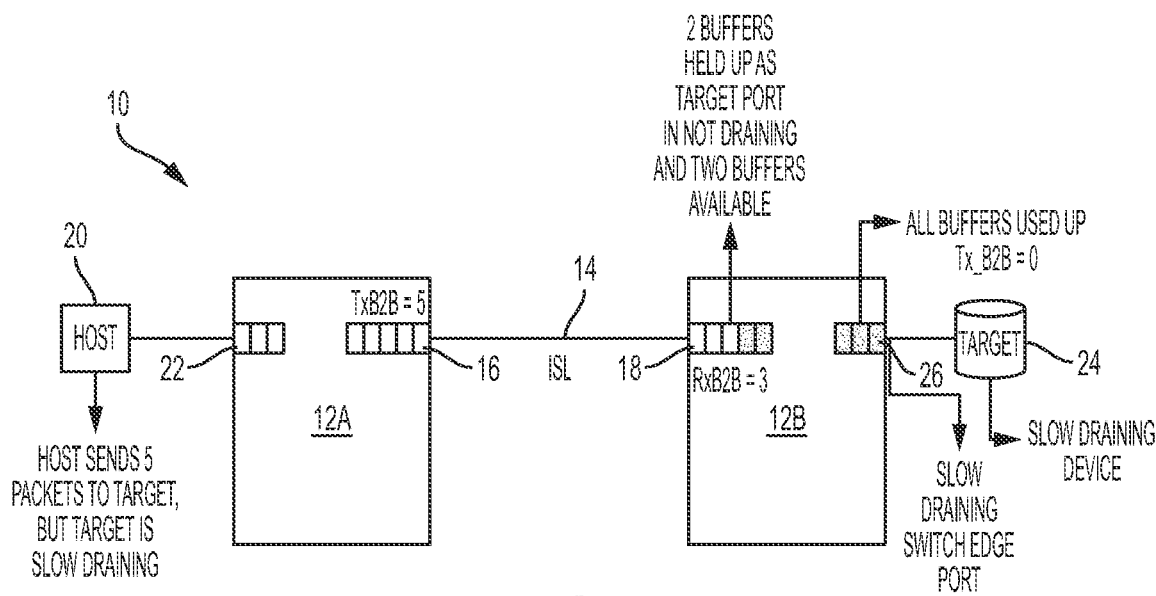
FIG. 2 is another simplified block diagram of an FC network in which embodiments described herein for just-in-time identification of slow drain devices in FC networks may be implemented.

Referring again to FIG. 1, as indicated by a reference numeral 28, host 20 has five packets ready to send to target 24. At the point illustrated in FIG. 1, RX_B2B of receive buffer 22 (associated with an edge port of switch 12A) is 3, TX_B2B of transmit buffer 16 (associated with an ISL port of switch 12A) is 5, RX_B2B of receive buffer 18 (associated with an ISL port of switch 12B) is 5, and TX_B2B of transmit buffer 26 (associated with an edge port of switch 12B) is 3. ISL ports of switch 12A and switch 12B may be referred to as "peer ports." Referring now to FIG. 2, illustrated therein is a simplified block diagram of the FC network 10 immediately after the five packets are sent form host 20 to target 24. It will be assumed for the sake of example that target 24 is a slow drain device, as exemplified by the fact that TX_B2B associated with the transmit buffer 26 is 0, such that the edge port of switch 12B with which the transmit buffer 26 is associated is deemed a slow drain switch edge port. Additionally, two of the five packets remain in the receive buffer 18, rendering the value of the RX_B2B counter associated with that buffer as 3.

Figure 3:
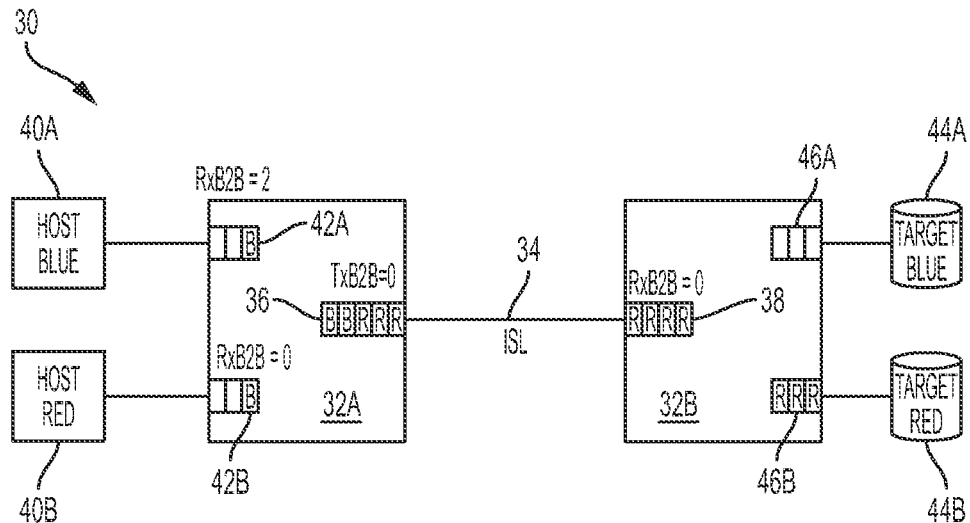
FIG. 3 is yet another simplified block diagram of an FC network in which embodiments described herein for just-in-time identification of slow drain devices in FC networks may be implemented.

FIG. 3 is a simplified block diagram of another FC network 30 in which embodiments described herein for just-in-time identification of slow drain devices in FC networks using interface statistics in a time-series database may be implemented. The FC network 30 is similar to the FC network 10 in that it includes two FC switches 32A, 32B, interconnected via an ISL 34 operatively disposed between a transmit buffer 36 associated with an ISL port of the switch 32A and a receive buffer 38 associated with an ISL port of the switch 32B. In the FC network 30, two hosts 40A, 40B, each of which may comprise a server, are operatively connected to respective receive buffers 42A, 42B of the switch 32A. Similarly, two targets 44A, 44B, which in the illustrated embodiment each comprises a SAN storage device, are operatively connected to a respective transmit buffer 46A, 46B, of the switch 32B. Each of the receive buffers 38, 42A, 42B, is associated with a port having associated therewith a RX_B2B counter. Similarly, each of the transmit buffers 36, 46A, 46B, is associated with a port having associated therewith a TX_B2B counter. Host 40A is configured to transmit packets to target 44A, while host 40B is configured to transmit packets to target 44B.

Although not shown, it will be recognized that one or more hypervisors may be executing on each of the hosts 40A, 40B, for instantiating a plurality of virtual machines ("VMs") for performing various tasks. In one embodiment, each of the FC switches 32A, 32B, is implemented using Cisco MDSes. FIG. 3 illustrates how a single slow drain device can impact other devices in the network 30. For purposes of example, it will be assumed that target 44B is a slow drain device. Packets designated by a letter "R" in the various buffers 36, 38, 42B, 46B, are transmitted from host 40B and destined for target 44B, while packets designated by a letter "B" in the various buffers are transmitted from host 40A and destined for target 44A. As is apparent from FIG. 3, communications between host 40A and target 44A over ISL 34 are impeded by the fact that all of the space of receive buffer 38 is consumed by packets destined for target 44B, which is slow draining the transmit buffer 46B.

Figure 4:
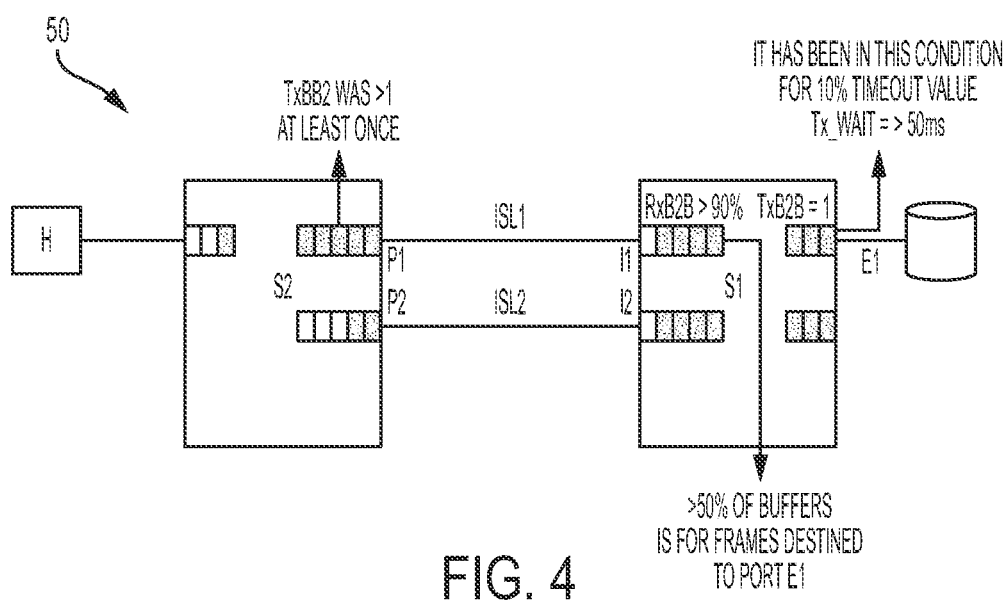
FIG. 4 is a simplified block diagram of an FC network illustrating a Level 1 Slow Drain condition in accordance with embodiments herein for just-in-time identification of slow drain devices in FC networks.

Currently, classification of a port as a slow port (meaning the port is connected to a slow drain device) involves a manual verification of B2B counters on edge ports and ISL-connected ports. Slow drain conditions may be classified into three levels in progression based on of the severity of the impact as follows. First, a Level 1 Slow Drain condition is one which causes mild congestion scenarios in the network. The slow drain end device sees higher latencies in completion of I/O. No frames are timeout dropped anywhere in the network. The switch has enough buffers to absorb the frames in flight to get over this end device condition. Level 1 Slow Drain is highly transient in nature, meaning that the device may transition in and out of the condition fairly quickly and frequently. FIG. 4 is a simplified block diagram of an FC network 50 in which a Level 1 Slow Drain condition exists, as will be described in greater detail below.

Figure 5:
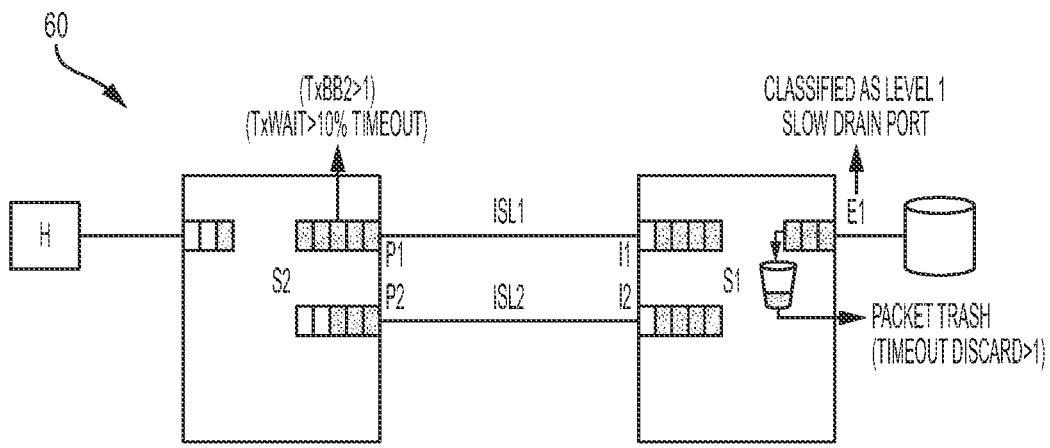
FIG. 5 is a simplified block diagram of an FC network illustrating a Level 2 Slow Drain condition in accordance with embodiments herein for just-in-time identification of slow drain devices in FC networks.

A Level 2 Slow Drain condition causes moderate congestion scenarios in the network. The switch edge port connected to the slow drain device starts timeout drops on the frames in TX direction due to delays exceeding the switch configured timeout value (default=500 ms). The device originating this frame on detecting no response may throw SCSI timeout errors and abort and retransmit the entire sequence from its end. While this scenario causes severe performance issues to the I/O from slow device, ISLs start seeing higher buffering latencies due to head of line blocking and higher I/O latencies result for other devices connected to the same switch as the slow device. This condition is generally fairly persistent in nature, primarily due to I/O retransmissions after frame drops. FIG. 5 is a simplified block diagram of an FC network 60 in which a Level 2 Slow Drain condition exists, as will be described in greater detail below.

Figure 6:
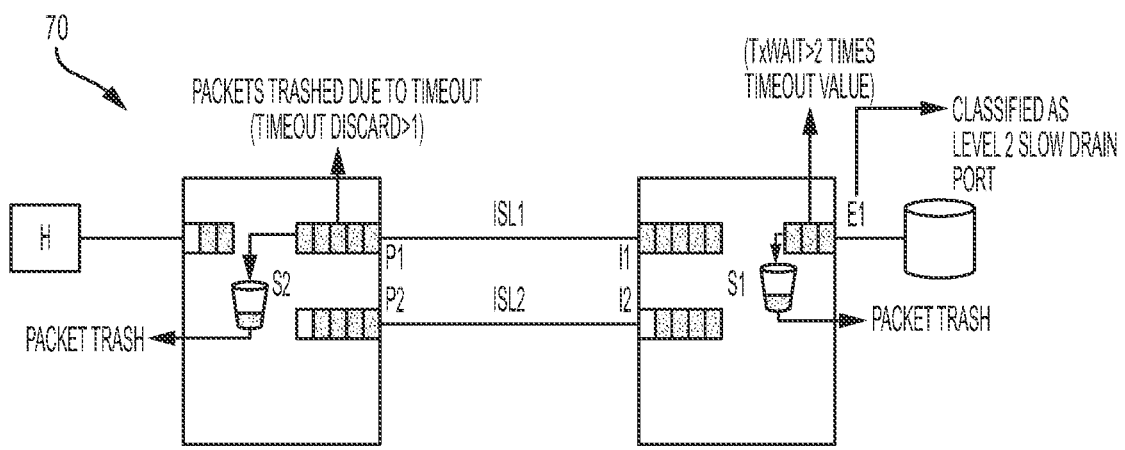
FIG. 6 is a simplified block diagram of an FC network illustrating a Level 3 Slow Drain condition in accordance with embodiments herein for just-in-time identification of slow drain devices in FC networks.

A Level 3 Slow Drain condition causes severe congestion in the network. In addition to timeout dropped frames on the switch edge port, a continuous wait condition of at least one second is seen on the switch edge port. Such high wait times can also cause frame timeout drops on the ISL ports. Frames of unrelated flows dropped on the ISL causes I/O sequence retransmits for unrelated devices in the network, which is clearly undesirable. Discarded FC frames on ISLs may impact I/O latencies of numerous servers in the SAN. Level 3 Slow Drain is considered a chronic condition since the slow device is having an exponentially deteriorative impact on other devices (in the same and potentially in other VSANs) and the SAN network as a whole. Current solutions to the Level 3 Slow Drain condition may include permanently fencing, or quarantining, such devices from the network. FIG. 6 is a simplified block diagram of an FC network 70 in which a Level 3 Slow Drain condition exists, as will be described in greater detail below.

Most deteriorating slow drain devices proceed from a Level 1 to Level 2 and then a Level 3 condition. Level 2 and 3 conditions start impacting other devices and ideally should be avoided in a healthy SAN. Automated slow drain detection and recovery action available today is usually aggressive and is done for mild congestion-like condition by monitoring of the TX_WAIT counter on edge ports using a software process referred to as credit monitoring, or "creditmon," and on this value crossing a configured threshold recovery action can be initiated. The recovery procedure involves resetting the credits on the port up to five times using a Link Reset ("LR") primitive. If the port is found to repeatedly entering this condition, the port is Error disabled and permanently removed from the SAN. The downside of this method is that it does not consider the impact of the slow device on the ISL ports, and a device which is habitually slow, such as a tape device, but not impacting anything else may be unfairly classified as a slow drain device and have action taken on it. Other techniques, such as port monitoring (based on Remote Monitor ("RMON")) on the MDS can only monitor B2B/TX_WAIT counters on one port and send out a trap if a monitored counter crosses a certain configured threshold. It cannot pinpoint a slow drain device, nor can monitor the behavior of one port in relation to another. At best, port monitor alerts integrated with a management station can be used by a network administrator to monitor a set of ports in case one of them becomes a slow drainer in the future. Other port monitor recovery actions, such as port guard, which can error disable a port, are available but seldom used. Alternate slow drain port recovery procedures are proposed that handle the situation in a non-disruptive fashion using quality of service ("QoS") techniques. For example, the traffic from slow devices may be marked down with low priority at the source, thereby deprioritizing and segregating traffic of that flow so that it has minimal impact on the rest of the devices in the SAN.

Automatic detection and remediation of Level 1 and Level 2 Slow Drain conditions are not currently available. Currently, detection of a Level 1 or Level 2 Slow Drain condition requires rigorous and manual troubleshooting by a SAN administrator, who must wade through CLI outputs on the supervisor, line cards and Simple Network Management Protocol ("SNMP") counter and make a judgement call.

While using consolidated troubleshooting commands for capturing various slow drain related counters from various sources can ease some of the efforts, a manual process of inference from the captured troubleshooting data is still required. Due to the manual nature of the process, it is quite possible that by the time it is identified, a device has already been classified as a slow drain device and automatic recovery action is taken. The counters on the switch have no notion of time; hence the first time the counter increments, other conditions need to be immediately verified in real time. Instantaneous, voluminous logs need to be checked and trends observed. It is critical to observe the counters the moment the slow drain event occurs; otherwise, the counter/logs may roll over, rendering detection of the event impossible. During a Level 1 Slow Drain condition, there may be no other visible symptoms anywhere in the SAN other than above normal host-to-disk response times involving the slow device. The slow device will slowly start exerting pressure on the ISL links before it starts exhibiting Level 2-like symptoms. The larger the SAN, the more ports that need to be monitored, making accurate deduction using a manual procedure a tougher problem.

When an ISL is operating in High/Low or ER_RDY crediting mode, detecting slow drain condition on the ISL based on counters described above is not possible since the TX_B2B counters that monitor link level credits on such ISLs never go to zero. All data traffic in Class 2/3 (i.e., data) frames that are flowing to the slow device uses up all low credits or a particular one of the channel credits while high credits or other channels have buffers still available. When an ISL is configured as a PC, high credits on the non-FOP port will never hit a buffer exhaustion condition. In both of these modes, any logic based on calculating link-level credits will fail, since the TX_WAIT and TX_BBZ counters will not increment, since they operate on the total buffers on the ports as a whole. The first symptoms seen will be the TIMEOUT_DISCARD and credit starvation associated with Level 2/3 directly.

In the presence of multiple slow drain devices connected to a switch, the degradation from Level 2 to Level 3 congestion will happen much faster. As previously noted, most slow drain devices deteriorate from Level 1 to Level 3 condition over a period of time extending up to several minutes or hours. As a result, there is sufficient time to poll data from the switches to detect this deterioration. Given that non-disruptive methods of treating slow drain devices (e.g., QoS based quarantine) exist, an automatic and accurate determination of when a Level 1/2 slow drain condition has occurred on an edge port aids in addressing slow drain devices just-in-time in the deterioration cycle in a non-disruptive manner. Just-in-time quarantine means devices are not over-cautiously penalized for exhibiting slow symptoms and Level 3-like conditions may be avoided, thereby avoiding impacting unrelated devices in the SAN. Just-in-time quarantine means that a mild congestion on the edge port is not classified as a slow drain device, as is currently the case, and these devices are allowed to operate normally in the SAN until they begin impacting other devices. As a result, an automatic and accurate identification of when a Level 1/2 condition has occurred on an edge port, as facilitated by embodiments described herein, can be of immense value.

Figure 7:
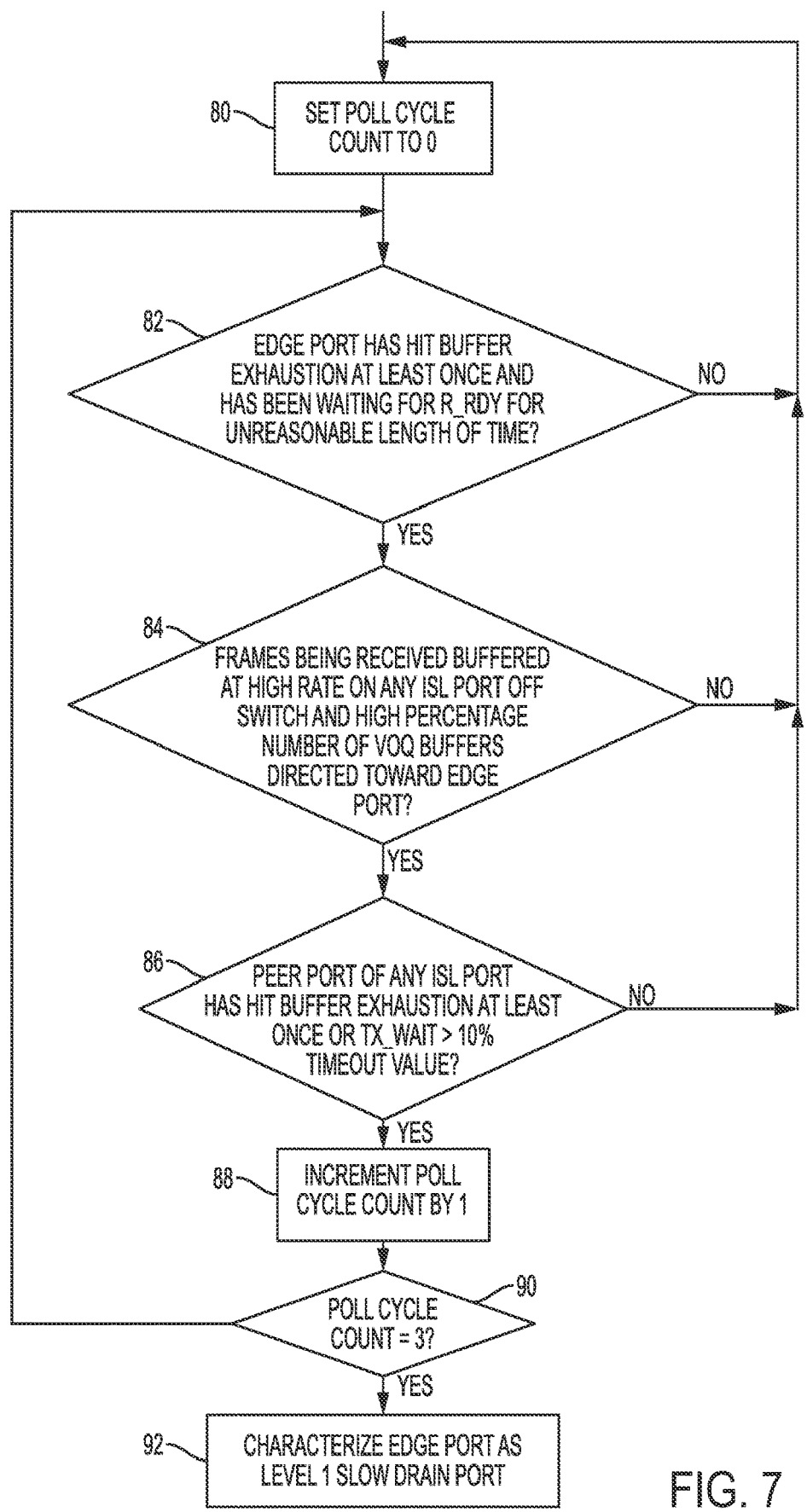
FIG. 7 is a flowchart illustrating steps that may be performed in detecting a Level 1 Slow Drain condition in accordance with embodiments described herein for just-in-time identification of slow drain devices in FC networks.
Figure 8:
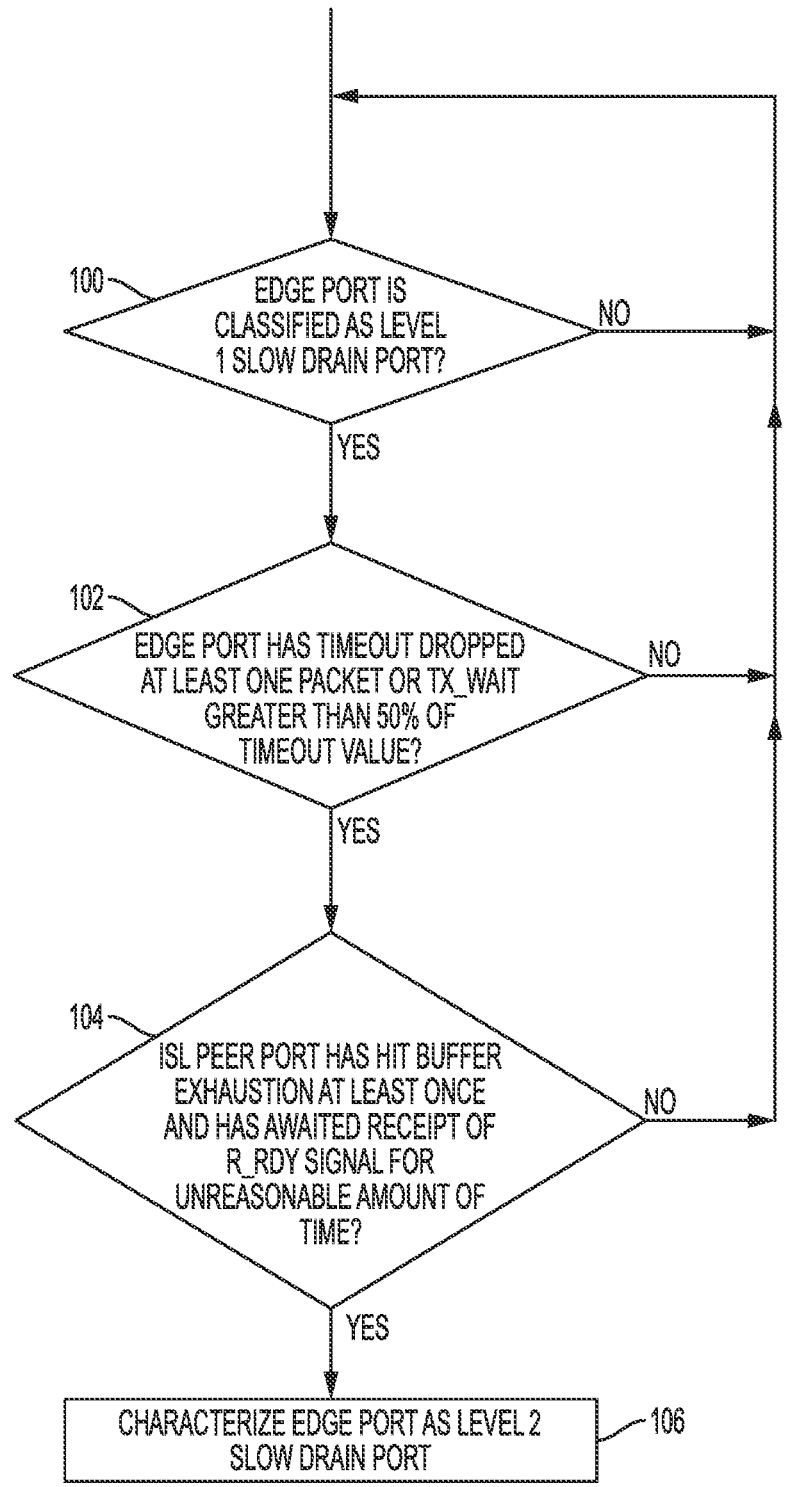
FIG. 8 is a flowchart illustrating steps that may be performed in detecting a Level 2 Slow Drain condition in accordance with embodiments described herein for just-in-time identification of slow drain devices in FC networks.
Figure 9:
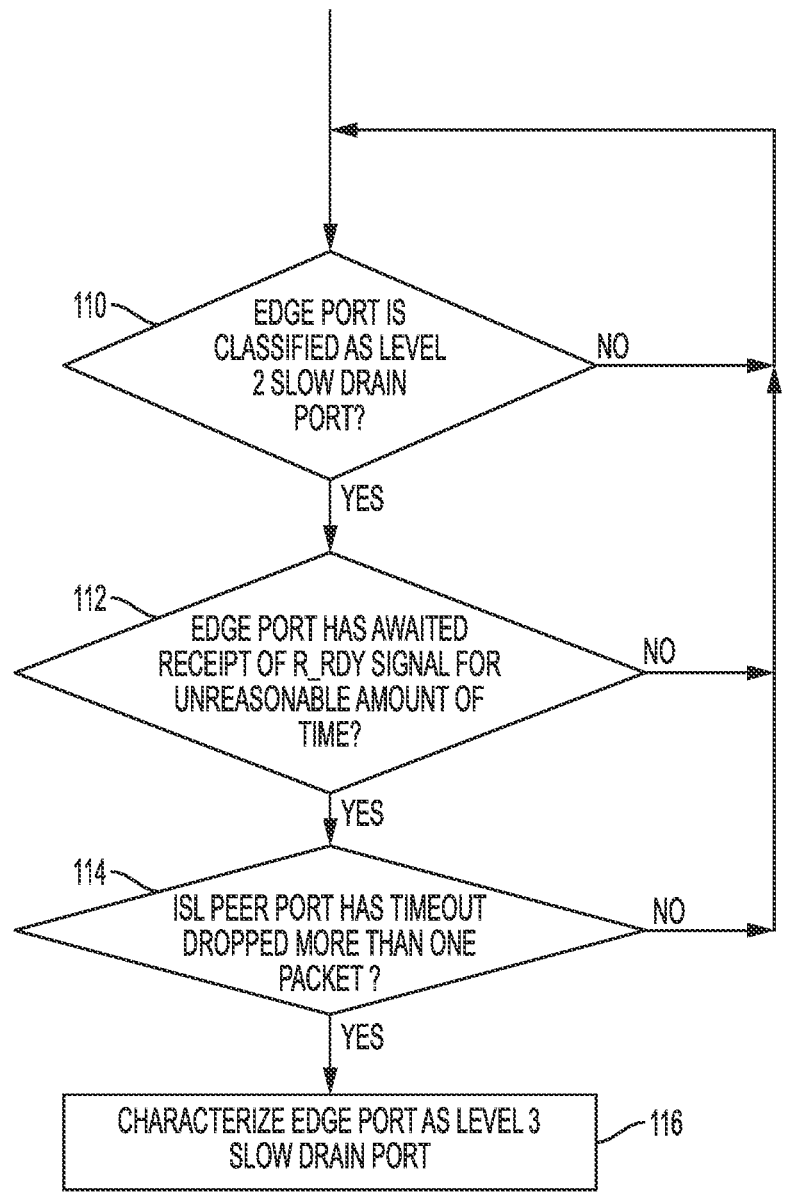
FIG. 9 is a flowchart illustrating steps that may be performed in detecting a Level 3 Slow Drain condition in accordance with embodiments described herein for just-in-time identification of slow drain devices in FC networks.

In accordance with features of embodiments described herein, the three levels of congestion/slow drain condition discussed above may be characterized algorithmically, as illustrated in FIGS. 7-9 (described below). Level 1 (Mild) Congestion may be characterized as follows: (1) an edge port ("E1") of a switch ("S1") connected to the target has hit buffer exhaustion at least once (i.e., TX_BBZ≥1) and has been waiting for an R_RDY signal from the end device (target) at least 10% of the timeout value (i.e., TX_WAIT 50 ms, where timeout value is 500 ms); and (2) on any ISL port ("I1 . . . In") of switch S1, frames are being ingress buffered at an unhealthy rate (e.g., RX_B2B 90% utilization) and >10% of virtual ("VoQ") buffers are directed toward the edge port E1; and (3) any peer ISL port ("P1 . . . Pn") of a second switch ("S2") corresponding to any ISL port I1 . . . In has hit buffer exhaustion at least once (TX_BBZ≥1) or TX_WAIT>10% of timeout value. If all the above conditions are met during at least three consecutive poll cycles, a slow drain trend is observed and edge port E1 is classified as a potential slow port. Flows to the edge (target) device might be arriving through multiple ISLs (e.g., I2, I3, I4) on the switch S1 and the list of all the ISL ports and corresponding peer ISL ports on switch S2 impacted are also noted. The list of ISLs to be checked can be determined by performing a lookup on the link state FSPF database of the switch. This scenario is illustrated in FIG. 4.

FIG. 7 is a flowchart illustrating steps that may be performed in detecting a Level 1 Slow Drain condition with respect to edge port E1 on switch S1 in accordance with embodiments described herein for just-in-time identification of slow drain devices in FC networks using interface statistics in a time-series database. Referring to FIG. 7, in step 80, a poll cycle count is set to 0. In step 82, a determination is made whether edge port E1 has hit buffer exhaustion at least once and has been awaiting an R_RDY signal from the target device for an unreasonable amount of time (e.g., 10% of the timeout value). As noted above, the default value for the timeout value is 500n ms; therefore, in certain embodiments, it will be determined whether edge port E1 has been waiting for an R_RDY signal from the target device for at least 50 ms. If a negative determination is made in step 82, execution returns to step 80. If a positive determination is made in step 82, execution proceeds to step 84. In step 84, a determination is made whether frames are being RX buffered at an unusually high rate (e.g., at least 90% utilization) on any ISL port of switch S1 and an unusually high percentage (e.g., 10%) of VoQ buffers are directed toward the edge port E1. If a negative determination is made in step 84, execution returns to step 80; otherwise, execution proceeds to step 86.

In step 86, a determination is made whether any peer ISL port corresponding to any ISL port of switch S1 has hit buffer exhaustion at least once. If not, execution returns to step 80; otherwise, execution proceeds to step 88. In step 88, the poll cycle count is incremented by 1. In step 90, a determination is made whether the poll cycle count is equal to 3. If not, execution returns to step 82; otherwise, execution proceeds to step 92, in which the edge port E1 is characterized as a Level 1 Slow Drain port.

Figure 10:
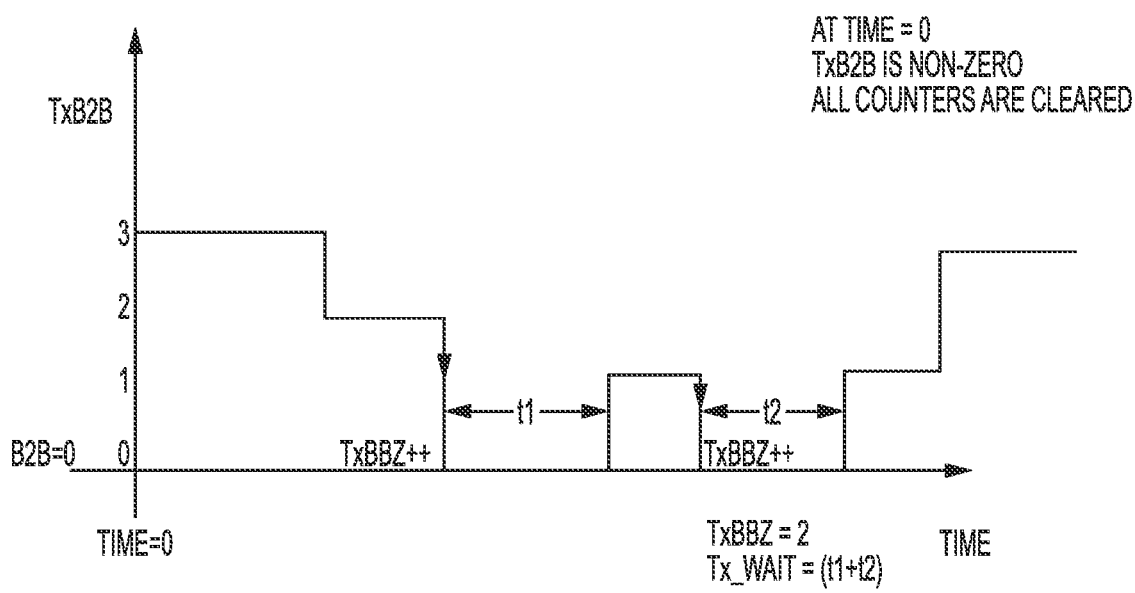
FIG. 10 is a graph illustrating a relationship between a TX_BBZ counter and a TX_WAIT counter used in identifying slow drain devices in FC networks in accordance with embodiments described herein.

Level 2 (Moderate) Congestion may be characterized as follows: (1) the edge port E1 is classified as a Level 1 Slow Drain port; (2) edge port E1 timeout dropped a frame (TIMEOUT_DISCARD>=1) or TX_WAIT>50% of the timeout value; and (3) an ISL peer port hit buffer exhaustion at least once (TX_BBZ≥1) and waited for receipt of an R_RDY signal for up to 10% of the timeout value (TX_WAIT≥50 ms, where timeout value is 500 ms). The ISL ports typically have more credits than edge ports (by default ~500 credits on ISL ports and ~16 on edge ports) and hence TIMEOUT_DISCARDs will first be observed on the edge port before the ISLs. Given that multiple ISLs might be feeding traffic to the edge port, a TX_WAIT of the order of even 50 ms is considered to be high for an ISL port. This scenario is illustrated in FIG. 5. A relationship between TX_BBZ and TX_WAIT is graphically illustrated in FIG. 10.

Referring now to FIG. 8, illustrated therein is a flowchart showing steps that may be performed in detecting a Level 2 Slow Drain condition with respect to edge port E1 on switch S1 in accordance with embodiments described herein for just-in-time identification of slow drain devices in FC networks using interface statistics in a time-series database. Referring to FIG. 8, in step 100, a determination is made whether the edge port E1 is classified as a Level 1 Slow Drain port. If not, execution remains at step 100; otherwise, execution proceeds to step 102, in which a determination is made whether edge port E1 has timeout dropped at least one frame. If not, execution returns to step 100; otherwise, execution proceeds to step 104, in which a determination is made whether an ISL peer port hit buffer exhaustion at least once and waited for receipt of an R_RDY signal for an unreasonable amount of time (e.g., 10% of the timeout value, or 50 ms). If a negative determination is made in step 104, execution returns to step 100; otherwise, execution proceeds to step 106, in which the edge port E1 is classified as a Level 2 Slow Drain port.

Level 3 (Severe) Congestion may be characterized as follows: (1) edge port E1 is classified as a Level 2 Slow Drain port; (2) edge port E1 awaited receipt of an R_RDY signal for at least two times the timeout value, for example (e.g., TX_WAIT≥2*500 ms); and (3) any ISL peer port has timeout dropped more than one packet (TIMEOUT_DISCARD>1).

Since TX_WAIT is a counter measured at units of ASIC clock frequency at µs granularity, a higher level aggregation of this counter is performed by a software process that polls the slow drain counters at a frequency of about once every 100 ms. The process looks into TX_BBZ, TX_WAIT counters to deduce last 10 records (per port) of the TX_WAIT events and the cumulative delay for each event and calculates an AVG_TX_B2B_ZERO counter in ms. This counter is then used as a representation of the TX_WAIT counter. This scenario is illustrated in FIG. 6.

FIG. 9 is a flowchart illustrating steps that may be performed in detecting a Level 3 Slow Drain condition with respect to edge port E1 on switch S1 in accordance with embodiments described herein for just-in-time identification of slow drain devices in FC networks using interface statistics in a time-series database. Referring to FIG. 9, in step 110, a determination is made whether the edge port E1 is classified as a Level 2 Slow Drain port. If not, execution remains at step 110; otherwise, execution proceeds to step 112, in which a determination is made whether edge port E1 has awaited receipt of an R_RDY signal from edge device for an unreasonable amount of time (e.g., 1 second). If not, execution returns to step 110; otherwise, execution proceeds to step 114, in which a determination is made whether an ISL peer port has timeout dropped more than one packet. If a negative determination is made in step 114, execution returns to step 110; otherwise, execution proceeds to step 116, in which the edge port E1 is classified as a Level 3 Slow Drain port.

Figure 11:
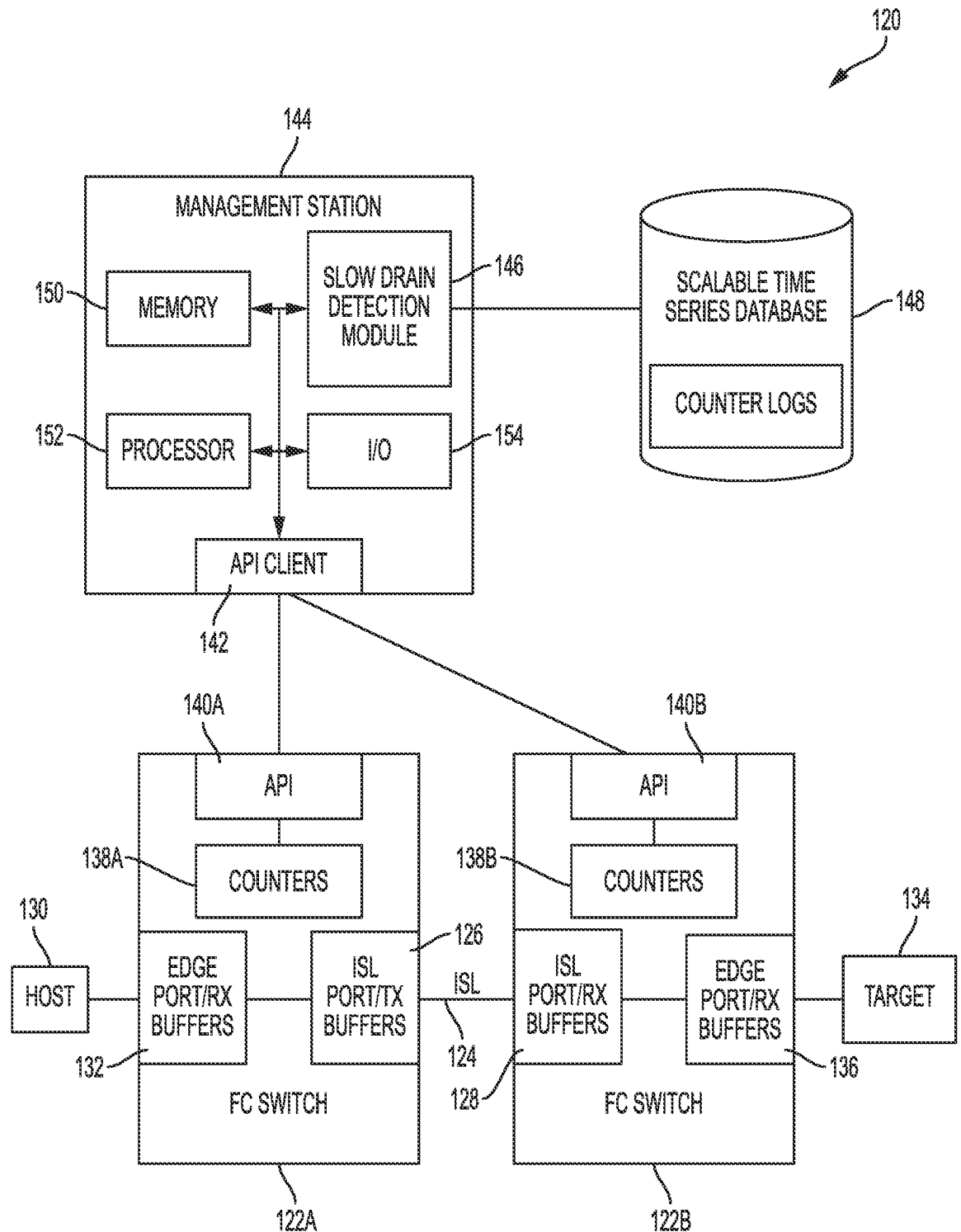
FIG. 11 is a simplified block diagram of an FC network in which embodiments described herein for just-in-time identification of slow drain devices in FC networks using interface statistics in a time-series database may be implemented.

Referring now to FIG. 11, illustrated therein is a simplified block diagram of an FC network 120 in which embodiments described herein for just-in-time identification of slow drain devices in FC networks using interface statistics in a time-series database may be implemented. As shown in FIG. 11, the network 120 includes one or more FC switches, represented in FIG. 11 by FC switches 122A, 122B, interconnected via an ISL 124 operatively disposed between an ISL port/transmit buffer 126 of the switch 122A and an ISL port/receive buffer 128 of the switch 122B. A host 130, which may comprise a server, is operatively connected to an edge port/receive buffer 132 of the switch 122A. Similarly, a target 134, which in the illustrated embodiment comprises a SAN storage device, is operatively connected to an edge port/transmit buffer 136 of the switch 122B. Each of the ports 126, 128, 132, and 136 has associated therewith one or more counters, which may include one or more of TX_B2B, RX_B2B, TX_BBZ, TX_WAIT, and TIMEOUT_DISCARD counters, collectively represented in each of the switches 122A, 122B, by counters 138A, 138B, respectively. In accordance with features of embodiments described herein, switches 122A, 122B, are implemented as MDS switches and each include an API 140A, 140B, for providing an external interface through which the counters 138A, 138B, may be queried with an API client 142 installed on a management station 144.

In accordance with features of embodiments described herein, the counters 138A, 138B, are periodically polled by a slow drain detection module 146 of the management station 144 at a frequency of approximately once every five seconds, for example. It will be recognized that the polling frequency may have to be tuned based on the size of the network and processing capability of the management station.

Additional intermediate levels between the three proposed levels with tunable TX_WAIT options can be defined by implementations for finer ways of classifying a slow drain device and then taking action on them.

Logs of the counters generated from all the ports of all switches in the network 120, including switches 122A, 122B, may be maintained in a time series database 148 in which data is stored indexed over time. In certain embodiments, NX-OS software running on MDS switches supports a REST based NX-API interface through which interface counters can be queried using an NX-API client installed on the management station 144. The NX-API based interface is integrated with the NX-OS CLI mechanism and is much efficient and faster (e.g., 10 times faster) than an SNMP-based MIB query mechanism.

The time series data is not particularly suited for traditional relational database management systems and is amenable to being filtered on arbitrary patterns defined by time of day, low value filters, high value filters, and additional statistical functions. As a result, it is particularly well-suited for the use case described herein for supporting fast and efficient queries based on counter threshold values at a given point of time. The scalable time series database 148 may be implemented using OpenTSDB, which may be used to store and serve massive amount of time series data without losing granularity. Such a tool may also write with ms precision and scale to millions of writes per second or higher if more compute nodes are added. Such a tool also has an HTTP interface through which it can read interface counters from MDS switches once the NX-API client is installed. Other alternatives, such as Elastic Search or Mongo DB, may also be used. All such tools may be integrated with an MDS NMS agent, such as DCNM, to tap into the SAN topology and configuration database and provide a complete solution that can spot the trends relating to the three levels of congestion described above.

To detect a Level 1 Slow Drain condition, a topology database of switches and edge/ISL ports is built first. A time-based correlation is made on the AVG_TX_B2B_ZERO (TX_WAIT) counter on the edge port and the ISL peer port between two poll periods, as described in the algorithm above using time series data. If the AVG_TX_B2B_ZERO counter trend on edge port is identical to or larger than the AVG_TX_B2B_ZERO at the peer ISL port, the edge port is considered responsible for the slow draining ISL. A larger value can be expected when more than one slow device is identified on one switch. If the variances in wait times between edge ports and ISL peer ports aligns persistently for about 3 consecutive poll cycles, the edge port is classified a Level 1 Slow Drain device. The VoQ buildup at an ingress ISL port towards an egress slow port can be checked by existing CLI mechanism and acts as an additional verification step. Correlation of port data among different ports of the switch and peer ports on another switch is now possible due to the time series data maintained in the data base.

To detect a Level 2 Slow Drain from among the edge ports that are currently classified as Level 1 Slow Drain devices, again a time based correlation is made. In addition to the average wait counter increasing, the TIMEOUT_DISCARD counter also increments on the Level 1 Slow Drain edge port. The RX_B2B on the ISL port of the switch is showing a consistent RX_B2B close to zero and the ISL peer port is seeing a consistent increase in AVG_TX_B2B_ZERO in the order of 10% of the timeout value or more.

In certain embodiments, end devices must be automatically moved to quarantine by applying a priority markdown policy after Level 2 conditions are met. An aggressive policy may require doing so when a Level 1 condition itself is met.

The algorithms described herein may not function properly in the presence of High/Low or ER-RDY mode of operation of the ISL links. To handle such cases in a non-PC mode, several enhancements to FC ASICs are proposed. First, because the crediting mechanism occurs per priority/virtual channel, the TX_B2B, TX_BBZ, TX_WAIT and TIMEOUT_DISCARD counters are also implemented per priority/virtual channel. As a result, the algorithm can execute only on the logical portion of the ISL that is carrying data traffic and slow drain condition can be determined on it. Other channels are not impacted. To handle ISL PCs configured in this mode, a software solution is possible. For example, after the Port Channel Protocol is run and FOP for the PC is determined, High/Low mode is enabled only for the FOP and not for other ISLs, since these credits are going unused anyways. The protocol also needs to handle cases of changes in FOP by enabling and disabling the High/Low mode appropriately.

Quarantined devices may still be monitored applying same logic as described above by monitoring the quarantine channel credits and AVG_TX_B2B_ZERO to determine whether or not the Level 1/2 Slow Drain conditions have subsided. Once Level 1 and Level 2 have subsided for a predetermined number of few polling cycles, an administrator may be notified to take manual action to unquarantine these devices.

The same procedure described hereinabove may be extended to an NPIV scenario in which multiple logins occur on an edge port. The new generation FC ASICs are capable of attributing the TX_WAIT on an edge port to a specific FCID behind it using heuristics. Classification of a slow device (FCID) from the set of devices behind an edge port should then be possible.

Embodiments described herein enable just-in-time identification of slow drain devices such that non-disruptive quarantine action may be taken with respect to those devices. As a result, even early suspect devices showing Level 1 Slow Drain symptoms can be safely put in a remedial path. Additionally, embodiments described herein eliminate complicated manual slow drain device identification currently required to be performed by a specialist. Moreover, embodiments described herein are easily integrated into network monitoring automation processes.

It will be recognized that the various network elements shown in the drawings may be implemented using one or more computer devices comprising software embodied in one or more tangible media for facilitating the activities described herein. The computer devices for implementing the elements may also include a memory device (or memory element) for storing information to be used in achieving the functions as outlined herein. Additionally, the computer devices may include one or more processors capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, various functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Referring again to FIG. 11, as previously noted, the management station 144 includes a slow drain detection module 146, which may include software embodied in one or more tangible media for facilitating the activities described herein. In particular, the module 146 may include software for facilitating the processes illustrated in and described with reference to FIGS. 7-9. The management station 144 may also include a memory device 150 for storing information to be used in achieving the functions as outlined herein. Additionally, the management station 144 may include a processor 152 that is capable of executing software or an algorithm (such as embodied in module 146) to perform the functions as discussed in this Specification. The management station 144 may also include various I/O 154 necessary for performing functions described herein.

It will be recognized that the management station 144 shown in FIG. 11, as well as other network devices shown and described herein, may be implemented using one or more computer devices comprising software embodied in one or more tangible media for facilitating the activities described herein. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 7-9 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 7-9. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 12:
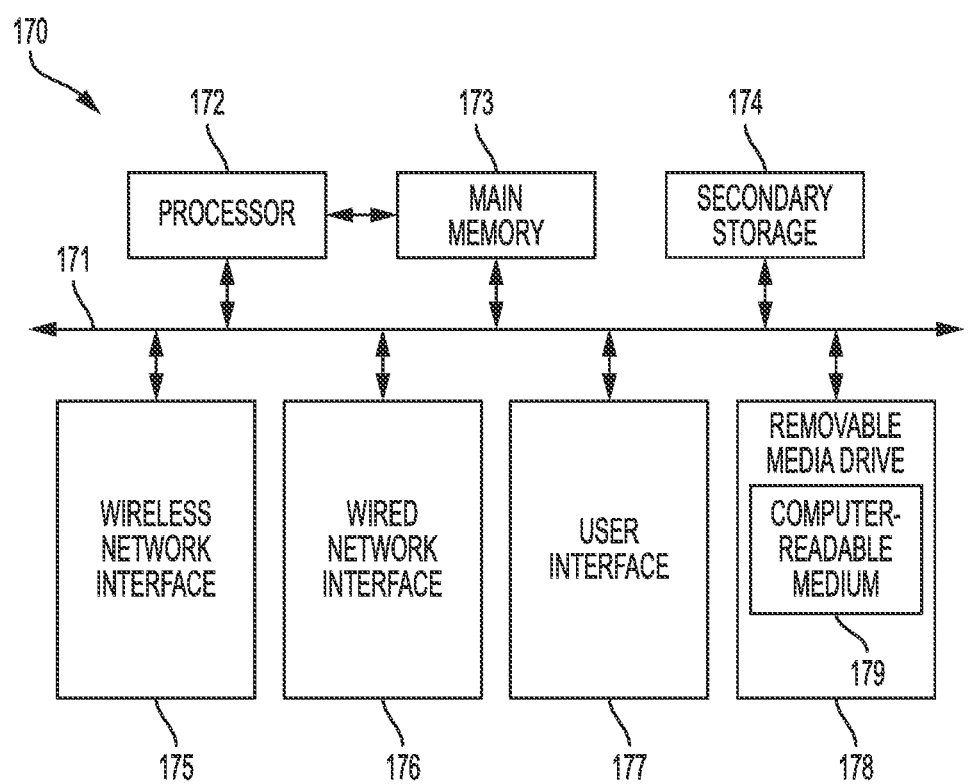
FIG. 12 illustrates a machine comprising an element of the various FC networks described herein for just-in-time identification of slow drain devices in FC networks using interface statistics in a time-series database.

Turning to FIG. 12, illustrated therein is a simplified block diagram of an example machine (or apparatus) 170 that may be implemented as an element of a system for use in implementing a technique for enabling dynamic update of network device data models in accordance with embodiments described herein. The example machine 170 corresponds to network elements and computing devices that may be deployed in any one of the networks illustrated and described herein, such as network 120, including for example, FC switches 122A, 122B, host 130, target 134, and management station 144. In particular, FIG. 12 illustrates a block diagram representation of an example form of a machine within which software and hardware cause machine 170 to perform any one or more of the activities or operations discussed herein. As shown in FIG. 12, machine 170 may include a processor 172, a main memory 173, secondary storage 174, a wireless network interface 175, a wired network interface 176, a user interface 177, and a removable media drive 178 including a computer-readable medium 179. A bus 171, such as a system bus and a memory bus, may provide electronic communication between processor 172 and the memory, drives, interfaces, and other components of machine 170.

Processor 172, which may also be referred to as a central processing unit ("CPU"), can include any general or special-purpose processor capable of executing machine readable instructions and performing operations on data as instructed by the machine readable instructions. Main memory 173 may be directly accessible to processor 172 for accessing machine instructions and may be in the form of random access memory ("RAM") or any type of dynamic storage (e.g., dynamic random access memory ("DRAM")). Secondary storage 174 can be any non-volatile memory such as a hard disk, which is capable of storing electronic data including executable software files. Externally stored electronic data may be provided to computer 170 through one or more removable media drives 178, which may be configured to receive any type of external media such as compact discs ("CDs"), digital video discs ("DVDs"), flash drives, external hard drives, etc.

Wireless and wired network interfaces 175 and 176 can be provided to enable electronic communication between machine 170 and other machines via networks (e.g., control plane 108, data plane 110. In one example, wireless network interface 175 could include a wireless network controller ("WNIC") with suitable transmitting and receiving components, such as transceivers, for wirelessly communicating within a network. Wired network interface 176 can enable machine 170 to physically connect to a network by a wire line such as an Ethernet cable. Both wireless and wired network interfaces 175 and 176 may be configured to facilitate communications using suitable communication protocols such as, for example, Internet Protocol Suite ("TCP/IP"). Machine 170 is shown with both wireless and wired network interfaces 175 and 176 for illustrative purposes only. While one or more wireless and hardwire interfaces may be provided in machine 170, or externally connected to machine 170, only one connection option is needed to enable connection of machine 170 to a network.

A user interface 177 may be provided in some machines to allow a user to interact with the machine 170. User interface 177 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 178 represents a drive configured to receive any type of external computer-readable media (e.g., computer-readable medium 179). Instructions embodying the activities or functions described herein may be stored on one or more external computer-readable media. Additionally, such instructions may also, or alternatively, reside at least partially within a memory element (e.g., in main memory 173 or cache memory of processor 172) of machine 170 during execution, or within a non-volatile memory element (e.g., secondary storage 174) of machine 170. Accordingly, other memory elements of machine 170 also constitute computer-readable media. Thus, "computer-readable medium" is meant to include any medium that is capable of storing instructions for execution by machine 170 that cause the machine to perform any one or more of the activities disclosed herein.

Not shown in FIG. 12 is additional hardware that may be suitably coupled to processor 172 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 170 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 170 to appropriately manage the operation of the hardware components therein.

The elements, shown and/or described with reference to machine 170, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described hererin (e.g., the steps shown in FIG. 2) may be implemented in software in, for example, FC switches 12, 90, 94, and 120. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, FC switches 12, 90, 94, 120 are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 173, secondary storage 174, computer-readable medium 179) can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 172) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    determining whether a first condition has been met, the first condition including that an edge port, in a fibre channel network, has experienced buffer exhaustion at least once;
    determining whether a second condition has been met in response to the first condition being met, the second condition including that at least a portion of data frames received at a first switch in the fibre channel network is being buffered at the first switch, wherein the first switch is coupled to the edge port through one or more first inter-switch links;

determining whether a third condition has been met in response to the second condition being met, the third condition including that a port of a second switch in the fibre channel network that is a peer to the first switch has experienced buffer exhaustion at least once, wherein the second switch is coupled to the first switch through one or more second inter-switch links;

when the first condition, the second condition, and the third condition have been met a first predetermined number of times, characterizing a congestion level of the edge port;

when the congestion level is characterized as a level 1 slow drain port:

determining whether a fourth condition has been met, the fourth condition including that the edge port has timeout dropped at least one data packet;

when the fourth condition has been met, determining whether a fifth condition has been met, the fifth condition including that the port has hit buffer exhaustion a second predetermined number of times and has awaited receipt of ready signal from the first switch for a second predetermined time period;

when the fifth condition has been met, characterizing the edge port as a level 2 slow drain port;

when the congestion level is characterized as the level 2 slow drain port:

determining whether a sixth condition has been met, the sixth condition including that the edge port has awaited receipt of a ready signal from a target device for a third predetermined time period; and when the sixth condition has been met, determining whether a seventh condition has been met, the seventh condition including determining whether the port has dropped a third predetermined number of packets and has awaited receipt of a ready signal from the first switch for a fourth predetermined time period; and taking remedial action based on the congestion level of the edge port.

2. The method of claim 1, further comprising:
taking level 1 remedial action in connection with the edge port when the congestion level is characterized as a level 1 slow drain port.

3. The method of claim 1, further comprising:
taking level 2 remedial action in connection with the edge port when the congestion level is characterized as a level 2 slow drain port.

4. The method of claim 1, further comprising:
taking level 3 remedial action in connection with the edge port when the congestion level is characterized as a level 3 slow drain port.

5. The method of claim 1, further comprising:
periodically polling a first plurality of interface counters associated with the edge port and another port, the edge port connected to a target device;
periodically polling a second plurality of interface counters associated with the port of, the another port and the port;
storing counter data obtained via the polling in a time series database.

6. One or more non-transitory tangible media that includes code for execution and when executed by a processor is operable to perform operations comprising:
determining whether a first condition has been met, the first condition including that an edge port, in a fibre channel network, has experienced buffer exhaustion at least once;

determining whether a second condition has been met in response to the first condition being met, the second condition including that at least a portion of data frames received at a first switch in the fibre channel network is being buffered at the first switch, wherein the first switch is coupled to the edge port through one or more first inter-switch links;

determining whether a third condition has been met in response to the second condition being met, the third condition including that a port of a second switch in the fibre channel network that is a peer to the first switch has experienced buffer exhaustion at least once, wherein the second switch is coupled to the first switch through one or more second inter-switch links;

when the first condition, the second condition, and the third condition have been met a first predetermined number of times, characterizing a congestion level of the edge port;

when the congestion level is characterized as a level 1 slow drain port:

determining whether a fourth condition has been met, the fourth condition including that the edge port has timeout dropped at least one data packet;

when the fourth condition has been met, determining whether a fifth condition has been met, the fifth condition including that the port has hit buffer exhaustion a second predetermined number of times and has awaited receipt of ready signal from the first switch for a second predetermined time period;

when the fifth condition has been met, characterizing the edge port as a level 2 slow drain port;

when the congestion level is characterized as the level 2 slow drain port:

determining whether a sixth condition has been met, the sixth condition including that the edge port has awaited receipt of a ready signal from a target device for a third predetermined time period; and when the sixth condition has been met, determining whether a seventh condition has been met, the seventh condition including determining whether the port has dropped a third predetermined number of packets and has awaited receipt of a ready signal from the first switch for a fourth predetermined time period; and taking remedial action based on the congestion level of the edge port.

7. The media of claim 6, wherein the operations include taking level 1 remedial action in connection with the edge port when the congestion level is characterized as a level 1 slow drain port.

8. The media of claim 6, wherein the operations including taking level 2 remedial action in connection with the edge port when the congestion level is characterized as the level 2 slow drain port.

9. The media of claim 6, wherein the operations include taking level 3 remedial action in connection with the edge port when the congestion level is characterized as a level 3 slow drain port.

10. The media of claim 6, wherein the operations include:
periodically polling a first plurality of interface counters associated with the edge port and another port, the edge port connected to a target device;
periodically polling a second plurality of interface counters associated with the port of, the another port and the port;
storing counter data obtained via the polling in a time series database.

11. An apparatus comprising:
a memory element configured to store data; and a processor operable to execute instructions associated with the data that, when executed, cause the processor to:
determine whether a first condition has been met, the first condition including that an edge port, in a fibre channel network, has experienced buffer exhaustion at least once;
determine whether a second condition has been met in response to the first condition being met, the second condition including that at least a portion of data frames received at a first switch in the fibre channel network is being buffered at the first switch, wherein the first switch is coupled to the edge port through one or more first inter-switch links;
determine whether a third condition has been met in response to the second condition being met, the third condition including that a port of a second switch in the fibre channel network that is a peer to the first switch has experienced buffer exhaustion at least once, wherein the second switch is coupled to the first switch through one or more second inter-switch links;
when the first condition, the second condition, and the third condition have been met a first predetermined number of times, characterize a congestion level of the edge port;
when the congestion level is characterized as a level 1 slow drain port:
determine whether a fourth condition has been met, the fourth condition including that the edge port has timeout dropped at least one data packet;
when the fourth condition has been met, determine whether a fifth condition has been met, the fifth condition including that the port has hit buffer exhaustion a second predetermined number of times and has awaited receipt of ready signal from the first switch for a second predetermined time period;
when the fifth condition has been met, characterize the edge port as a level 2 slow drain port;
when the congestion level is characterized as the level 2 slow drain port:
determine whether a sixth condition has been met, the sixth condition including that the edge port has awaited receipt of a ready signal from a target device for a third predetermined time period; and
when the sixth condition has been met, determine whether a seventh condition has been met, the seventh condition including determining whether the port has dropped a third predetermined number of packets and has awaited receipt of a ready signal from the first switch for a fourth predetermined time period; and
take remedial action based on the congestion level of the edge port.

12. The apparatus of claim 11, wherein the processor is further configured to take level 1 remedial action in connection with the edge port when the congestion level is characterized as a level 1 slow drain port.

13. The apparatus of claim 11, wherein the processor is further configured to take level 2 remedial action in connection with the edge port when the congestion level is characterized as a level 2 slow drain port.

14. The apparatus of claim 11, wherein the processor is further configured to take level 3 remedial action in connection with the edge port when the congestion level is characterized as a level 3 slow drain port.

15. The apparatus of claim 11, wherein the processor is further configured to:
periodically poll a first plurality of interface counters associated with the edge port and another port, the edge port connected to a target device;
periodically poll a second plurality of interface counters associated with the port of, the another port and the port;
store counter data obtained via the polling in a time series database.

* * * * *